United States Patent
Hall et al.

(10) Patent No.: US 11,289,921 B1
(45) Date of Patent: Mar. 29, 2022

(54) ENERGY STORAGE SYSTEM EMPLOYING SECOND-LIFE ELECTRIC VEHICLE BATTERIES

(71) Applicant: B2U Storage Solutions Inc., Santa Monica, CA (US)

(72) Inventors: Freeman Stoflet Hall, Santa Monica, CA (US); Michael Joseph Stern, Westlake Village, CA (US)

(73) Assignee: B2U STORAGE SOLUTIONS INC., Santa Monica, CA (US)

( * ) Notice: Subject to any disclaimer, the term of this patent is extended or adjusted under 35 U.S.C. 154(b) by 0 days.

(21) Appl. No.: 17/382,933

(22) Filed: Jul. 22, 2021

Related U.S. Application Data

(63) Continuation of application No. 17/118,497, filed on Dec. 10, 2020, now abandoned.

(51) Int. Cl.
| | |
|---|---|
| *H02J 7/00* | (2006.01) |
| *B60L 50/60* | (2019.01) |
| *B60L 53/80* | (2019.01) |
| *B60L 53/30* | (2019.01) |
| *B60L 53/60* | (2019.01) |

(52) U.S. Cl.
CPC ............ *H02J 7/0024* (2013.01); *B60L 50/66* (2019.02); *B60L 53/30* (2019.02); *B60L 53/60* (2019.02); *B60L 53/80* (2019.02); *H02J 7/0014* (2013.01); *H02J 7/00032* (2020.01); *H02J 7/00304* (2020.01); *B60L 2210/10* (2013.01); *B60L 2210/30* (2013.01); *B60L 2210/40* (2013.01); *H02J 2207/20* (2020.01)

(58) Field of Classification Search
CPC ...................................................... H02J 7/0024
USPC ........................................................... 320/109
See application file for complete search history.

(56) References Cited

U.S. PATENT DOCUMENTS

| | | |
|---|---|---|
| 7,547,980 B2 | 6/2009 | Harrison |
| 8,838,313 B2 | 9/2014 | Bolenbaugh |
| 9,347,996 B2 | 5/2016 | Uchida et al. |
| 9,431,832 B2 | 8/2016 | Ichikawa et al. |
| 10,183,583 B2 | 1/2019 | Narla |
| 10,411,500 B2 | 9/2019 | Qin et al. |
| 10,752,128 B1 | 8/2020 | Langton et al. |
| 10,759,287 B2 | 9/2020 | Vahedi et al. |
| 10,759,289 B2 | 9/2020 | Gou |
| 10,763,692 B2 | 9/2020 | Pelletier et al. |
| 10,784,702 B2 | 9/2020 | Kudo et al. |
| 10,926,644 B1 * | 2/2021 | Willson ............... H02J 7/0021 |
| 2007/0187957 A1 | 8/2007 | Harrison |
| 2012/0133337 A1 * | 5/2012 | Rombouts ................ H02J 3/32 |
| | | 320/155 |

(Continued)

*Primary Examiner* — Jerry D Robbins
(74) *Attorney, Agent, or Firm* — Buchanan Ingersoll & Rooney PC

(57) ABSTRACT

An integrated battery energy storage system and method for integrating electric vehicle battery packs into an integrated battery energy storage system are disclosed. The integrated battery energy system includes: a plurality of electric vehicle battery packs coupled in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series; and wherein the plurality of series strings of electric vehicle battery packs are connected in parallel.

20 Claims, 4 Drawing Sheets

(56) References Cited

U.S. PATENT DOCUMENTS

| | | | |
|---|---|---|---|
| 2014/0012443 A1 | 1/2014 | Bolenbaugh | |
| 2014/0015532 A1 | 1/2014 | Uchida et al. | |
| 2016/0185246 A1 | 6/2016 | Paul | |
| 2017/0301961 A1* | 10/2017 | Kim | .................. H04B 1/48 |
| 2017/0338519 A1* | 11/2017 | Junger | ................ H02J 7/0014 |
| 2017/0361717 A1 | 12/2017 | Qin et al. | |
| 2018/0170201 A1* | 6/2018 | Miller | .................... B60L 53/60 |
| 2019/0168630 A1 | 6/2019 | Mrlik et al. | |
| 2019/0207269 A1* | 7/2019 | Junger | .............. H01M 10/4207 |
| 2020/0067319 A1 | 2/2020 | Qin et al. | |
| 2020/0231064 A1* | 7/2020 | Zhao | ...................... B60L 53/80 |
| 2020/0313249 A1* | 10/2020 | Zhao | ...................... B60L 53/80 |
| 2021/0265710 A1* | 8/2021 | Muenzel | ............... H01M 50/51 |
| 2021/0313630 A1* | 10/2021 | Zeiler | ................ H01M 50/512 |

* cited by examiner

ENERGY STORAGE SYSTEM EMPLOYING SECOND-LIFE ELECTRIC VEHICLE BATTERIES

TECHNICAL FIELD

The present disclosure generally relates to an energy storage system and method employing second-life electric vehicle batteries, and more particularly to an integrated battery energy storage system, which includes a plurality of electric vehicle battery packs coupled in a series/parallel arrangement.

BACKGROUND

Reducing the cost of energy storage systems (ESS) is an important objective for electricity ratepayers and policymakers. A primary metric to measure ESS cost is the levelized cost of storage (LCOS), defined as the total lifetime cost of the ESS, including capital costs to construct as well as costs to operate, divided by the cumulative delivered electricity that the system has stored.

Repurposing electrochemical batteries from electric vehicles (EV) for a second use or second-life stationary storage application can significantly reduce the LCOS of ESS compared to using new batteries. Deploying EV batteries in stationary storage applications is the highest and best use of batteries when the batteries are no longer suitable for use in EVs. Larger scale ESS requires a large number of batteries to be deployed in series and parallel electrical configurations to deliver energy at high voltage and current levels. Whether electrically connected in front of or behind a customer's meter, an ESS must efficiently integrate and manage batteries over time and charge/discharge cycles to be effective.

SUMMARY

It would be desirable to have a system that utilizes a plurality of electric vehicle (EV) batteries in second-life stationary storage applications within an overall energy storage system (ESS).

In accordance with an aspect, an integrated battery energy storage system is disclosed, the integrated battery energy system comprising: a plurality of electric vehicle battery packs coupled in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series; and wherein the plurality of series strings of electric vehicle battery packs are connected in parallel.

In accordance with another aspect, an integrated battery energy storage system is disclosed, the integrated battery energy storage system comprising: a plurality of electric vehicle battery packs configured to store energy; an enclosure configured to enable outdoor deployment of the energy storage assembly; a plurality of removable exterior enclosure panels configured to facilitate ease of installation and removal of the plurality of electrical vehicle battery packs from the enclosure; a plurality of DC-to-DC converters configured to balancing a voltage or energy storage capacity of series connected electric vehicle battery packs; environmental controls within the enclosure configured to extend the usable lifetime of the plurality electric vehicle battery packs within the enclosure; a racking system for the plurality of electric vehicle battery packs, the racking system configured to provide electrical and thermal isolation between the plurality of electric vehicle battery packs; and an electric vehicle battery pack controller configured to use an electric vehicle pack battery management system without alteration from an original manufacturer's design and intended function.

In accordance with an aspect, a method is disclosed for integrating electric vehicle battery packs into an integrated battery energy storage system, the method comprising: coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series; and connecting the plurality of series strings of electric vehicle battery packs in parallel.

DETAILED DESCRIPTION

Figure 1:
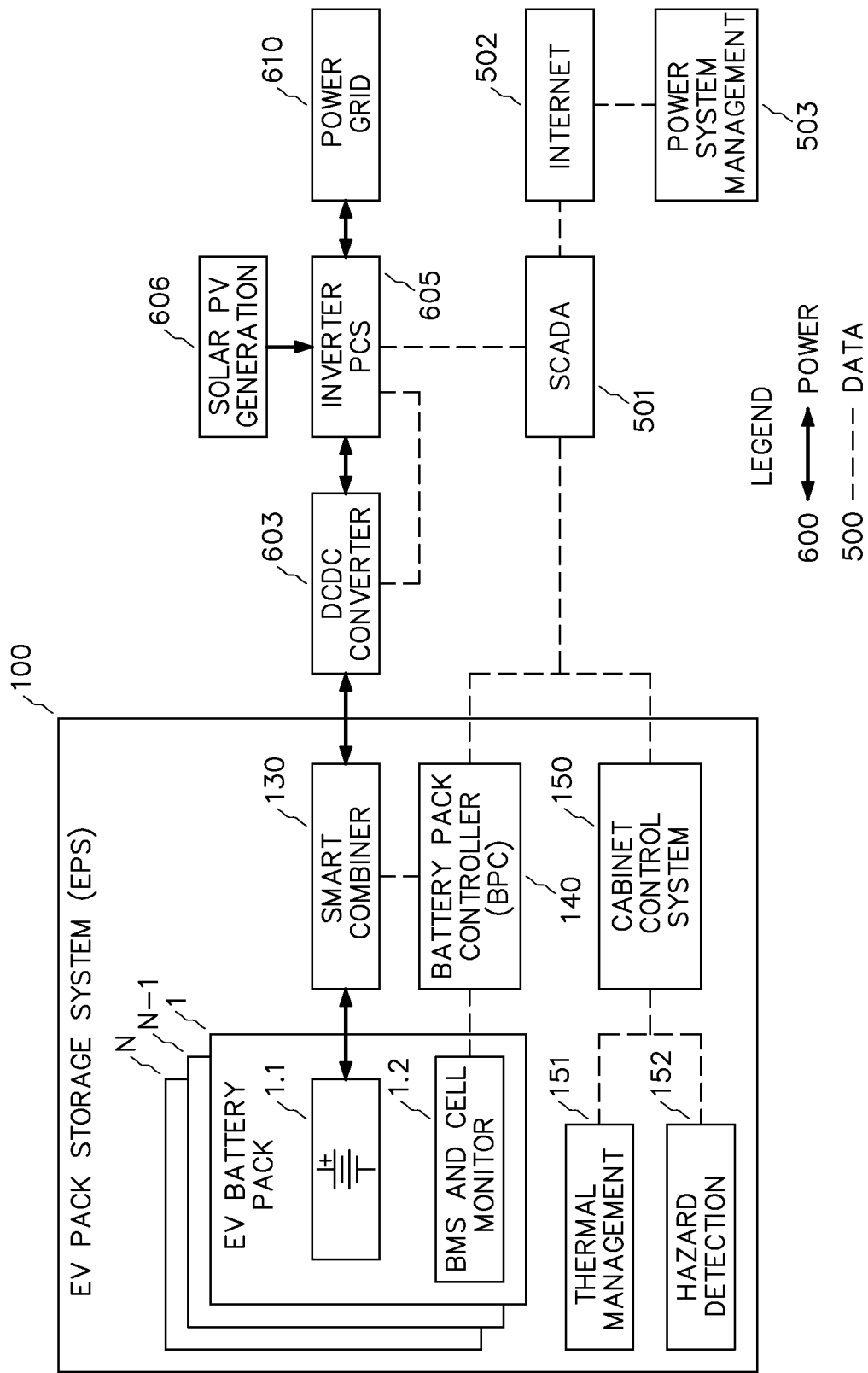
FIG. 1 is a block diagram illustrating the utility as part of an energy storage system in accordance with an exemplary embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

In accordance with an aspect, an EV pack storage system (EPS) employs the EV battery packs as an integrated functional unit or building block wherein a plurality of EV battery packs are rather easily aggregated to behave as a larger battery within an ESS. The batteries can be racked in a specialized environmentally controlled enclosure in the original pack casing in which the batteries were mounted in the EV. The specialized environmentally controlled enclosure functions as an integrated EV pack storage unit and the EPS functions as a sub-system building block within the overall ESS. The EV battery packs within the EPS may be electrically connected in series as well as in parallel. Each series string is protected with an overcurrent device. The EPS enclosure is designed for easy installation, removal and replacement of EV battery packs. Each battery pack and string may be monitored with a proprietary battery pack controller (BPC). The BPC helps ensure proper operating parameters and monitors the health of each EV battery pack. The battery pack controller (BPC) can monitor the health of each EV battery pack by interfacing with the EV pack integrated battery management system (BMS). The BPC manages a smart combiner (SC) to actively balance the second-life batteries in order to effectively utilize the charge and discharge cycle of individual packs adjusting for variance in each pack's capacity. The environment of the EPS enclosure is managed to maintain suitable operating temperatures, and for hazard detection. The EPS operates within a larger ESS that also includes an inverter Power Conversion System (PCS) and Supervisory Control and Data Acquisition (SCADA). Multiple EPS can operate in integrated fashion together within an ESS. The ESS can be configured as DC-coupled, or AC-coupled to the inverter. The EPS can be charged from on-site generation such as solar or wind, or from electricity provided by the AC power system. The EPS within the ESS can be deployed in front of the meter (IFM) directly interconnected to the grid or deployed behind the meter (BTM) to offset a customer's load and demand.

In accordance with an exemplary embodiment, an integrated system is disclosed for deploying a plurality of second-life electric vehicle (EV) battery packs within an energy storage system (ESS).

In the present disclosure, herein referred to as the EV pack storage system (EPS), is an integrated functional building block wherein a number of EV battery packs are easily aggregated to behave as a larger battery within an overall ESS. The EPS composition and function includes; (1) the EV battery packs are utilized, both mechanically and electrically, as they were in the original first-life vehicle application, incorporating the battery pack's battery management system (BMS) as well as a similar digital serial data link format and protocol; (2) the EV battery packs are electrically configured in a parallel arrangement and often in series. EV battery packs may not have been originally designed for use in series connection but this limitation is overcome with a unique design for mounting, communicating and interconnecting; (3) a number of EV battery packs are integrated into an environmentally controlled and monitored cabinet or enclosure which is not considered an occupiable space according to building or fire code definitions, and where a single enclosure, or multiple enclosures, can be integrated in the ESS; (4) a battery pack controller (BPC) is deployed as part of the EPS to integrate the communications and controls necessary for the batteries to work together and operate in coordination as a unified functional block; and (5) a smart circuit combiner provides electrical balancing and overcurrent protection for all EV battery packs within the EPS.

FIG. 1 is a block diagram illustrating the utility of the disclosure in a preferred embodiment as part of a grid-tied energy storage system. In accordance with an exemplary embodiment, the EV pack storage system (EPS) 100 can be implemented as part of an overall energy storage system (ESS). All heavy lines 600 with arrowheads indicate power connections and possible power flow directions. All dashed lines 500 indicate bidirectional digital data bus connections.

EPS 100 includes a plurality of EV battery packs, designated in FIG. 1 as blocks 1, N-1 and N to indicate any number N of identical EV battery packs. EV battery pack 1 contains batteries 1.1 and Battery Management System (BMS) 1.2. The EV battery pack batteries 1.1 through N.1 are connected in series at nominal voltages, which are multiples of a single pack's nominal voltage. A number N of EV battery packs are connected in a series/parallel configuration or otherwise aggregated within smart combiner 130 to electrically behave as a larger battery within the overall energy storage system. A smart combiner 130 is connected to a bidirectional DCDC (DC-to-DC) converter 603. A DCDC converter 603 can provide an optimum voltage match between the aggregate EV battery packs and the Inverter Power Conversion System (PCS) 605 to provide an optimum voltage match as the maximum power point of solar PV generation 606 changes with temperature and load. A smart combiner (SC) 130 can be used to actively balance the second-life batteries in order to effectively utilize the charge and discharge cycle of individual packs adjusting for variance in each pack's capacity.

When the overall system is delivering energy stored in the EV battery packs, for example, to a power grid 610, DC power flows from the EV battery packs, through smart combiner 130 and through DCDC converter 603. DC power is then converted to AC power by PCS 605 to supply energy to the power grid 610. Power from solar photovoltaic generation 606, when available, for example, can also flows through PCS 605, which functions as a DC to AC power converter to discharge power into power grid 610. In this configuration, the total power into power grid 610 can be, for example, a combination of battery sourced power and solar photovoltaic sourced power.

In accordance with an exemplary embodiment, when the overall system is delivering energy to charge EV battery packs 1 through N, PCS 605 functions as an AC to DC power converter by sourcing AC power from power grid 610 and converting it to DC power. This DC power flows through DCDC converter 603, through smart combiner 130 and into all EV battery packs 1 through N. Power from solar photovoltaic generation 606, when available, can either be used to reduce the power required from power grid 610 to charge EV battery packs 1 through N or if the power from available solar power generation 606 is greater than the power required to charge these EV battery packs, then the excess power can be delivered to power grid 610. Some system variants will not include solar PV onsite generation 606 and therefore DCDC converter 603 may not be required.

In accordance with an exemplary embodiment, a battery management system (BMS) 1.2 monitors every cell in the EV battery pack 1, primarily to check for mismatched, undercharged or overcharged cells in a series string. By monitoring and rebalancing mismatched cells, the usable lifetime of the EV battery pack can be enhanced, and battery cell and pack safe operating parameters can be ensured to avoid hazardous conditions. A Battery Pack Controller (BPC) 140 communicates with individual EV battery packs 1 through N over a digital data bus. Supervisory Control and Data Acquisition (SCADA) 501 communicates with BPC 140 to ascertain the state of charge, state of health and overall availability of the aggregate EV battery packs. In accordance with an exemplary embodiment, SCADA 501 receives top level commands from power system manager 503 via internet 502 to control the operation of the overall energy storage system.

SCADA 501 can also communicate with a cabinet control system 150. Within EPS 100, the cabinet control system 150 can communicate with thermal management block 151 and the hazard protection block 152. Thermal management block 151 provides air conditioning, dehumidification, venting, and air circulation as required to maintain an optimum environment for EV battery packs 1 through N. The hazard detection block 152 monitors the environment inside the EPS 100 enclosure for smoke and over/under temperature conditions.

Figure 2:
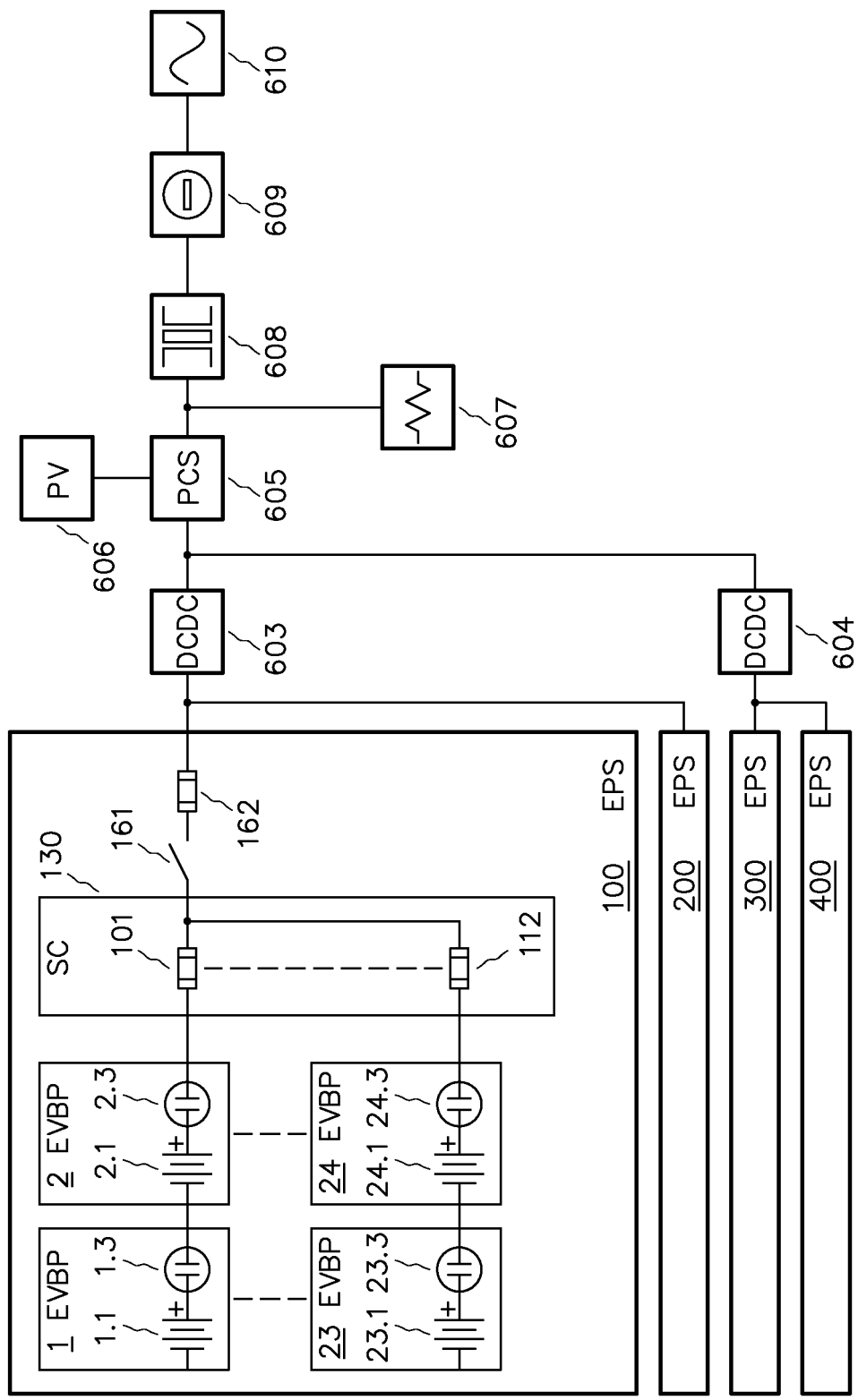
FIG. 2 is a modified electrical single-line schematic diagram of an energy storage system in accordance with an exemplary embodiment.

FIG. 2 is a modified single-line electrical diagram of an energy storage system in accordance with an exemplary embodiment and illustrates the power flow. This disclosure and description does not limit, however, the scope of the disclosure to systems with the number of elements and/or components described herein.

As illustrated in FIG. 2, the energy storage system, for example, has four EV pack storage assemblies (EPS) 100, 200, 300 and 400. Each EPS 100, 200, 300, 400, can be identical. However, each EPS may not be identical and modifications of one or more the EPSs 100, 200, 300, 400 may occur. In accordance with an exemplary embodiment, the EPS 100 contains 24 EV battery packs (EVBP) designated 1-24. Within each EVBP are a number of series or series parallel connected battery modules shown as 1.1 in EVBP 1 through 24.1 in EVBP 24. There is also a normally an open contactor, which may be configured as one or more series connected contactors designated, 1.3 in EVBP 1 through 24.3 in EVBP 24. EVBP 1-24 may also contain other power circuits, such as but not limited to pre-charge resistors and contactors. In this exemplary system, EVBP 1 through 24 are connected in a 2S12P circuit arrangement where EVBP pairs are connected in series and where 12 of these series strings are connected in parallel. The series strings pairs are 1/2, 3/4, 5/6, 7/8, 9/10, 11/12, 13/14, 15/16, 17/18, 19/20, 21/22, and 23/24. Each of the 12 series strings 1/2 through 23/24 are connected through fuses 101 through 112, respectively, in smart combiner 130. Fuses 101 through 112 provide a second tier of overcurrent protection to protect the EV batteries 1.1 through 24.1 from over-currents under abnormal conditions. Fuses 101 through 112 can also prevent contactors 1.3 through 24.3 from breaking currents outside safe contactor limits. Contactors 1.3 through 24.3 can provide the first tier of overcurrent protection, for currents less than fuse 101 through 112 ratings, as well as other circuit isolation and connection control functions. The output of smart combiner (SC) 130 is connected to switch 161, which connects or isolates the power circuits of EPS 100 from the other energy storage system components. Fuse 162 protects the ampacity of conductors and the break capability of switch 161. In accordance with an exemplary embodiment, circuit breakers or other overcurrent devices and systems may be substituted for fuses in FIG. 2.

In this system example, EPS 100 and 200 are connected to DCDC converter 603. EPS 300 and 400 are connected to DCDC converter 604. DCDC converter 603 can provide an optimum voltage match between parallel connected EPS 100 and EPS 200 and the inverter power conversion system (PCS) 605 to provide an optimum voltage match as the maximum power point of solar PV generation 606 changes with temperature and irradiance. Both DCDC converters 603 and 604 are capable of bidirectional power transfer, to either charge or discharge EV battery packs. PCS 605 is also bidirectional with respect to power flow.

When the overall system, for example, is delivering energy stored in EPS 100, 200, 300 and 400 batteries to power grid 610 and/or local loads 607, DC power flows from EPS 100 and 200 through DCDC converter 603 and in parallel from EPS 300 and 400 through DCDC power converter 604. DC power can then be converted to AC power by PCS 605. AC power then flows through distribution transformer 608, where the voltage can be raised to more efficient distribution voltage levels and through revenue meter 609 before connection to power grid 610. Power from solar photovoltaic generation 606, when available and utilized, also flows through PCS 605 and PCS 605 functions as a DC to AC power converter to source power into power grid 610 and/or local loads 607. The total power into power grid 610 can be the sum of battery sourced power plus solar photovoltaic sourced power minus the power used by local loads 607. Local loads may also be supported without a connection to power grid 610 in which case PCS 605 works in a "stand alone" AC voltage regulation mode.

When the overall energy storage system is delivering energy to charge EV battery packs in EPS 100, 200, 300 and 400, PCS 605 functions as an AC to DC power converter by sourcing AC power from power grid 610 and converting AC to DC power. In accordance with an exemplary embodiment, the DC power flows through DCDC converters 603 and 604 to charge EV battery packs in EPS 100, 200, 300 and 400. Power from solar photovoltaic generation 606, when available, for example, can either be used to reduce the power required from the power grid 610 to charge EV battery packs, or if the power available from solar power generation 606 is greater than the power required to charge these EV battery packs and supply local "behind the meter" loads 607, then the excess power can be delivered to power grid 610.

In accordance with an alternate embodiment as shown in FIG. 2, the energy storage system can include one or more of the following: PCS 605, DCDC converter 603, transformer 608 and power meter 609, as part of the integrated EPS 100.

Figure 3:
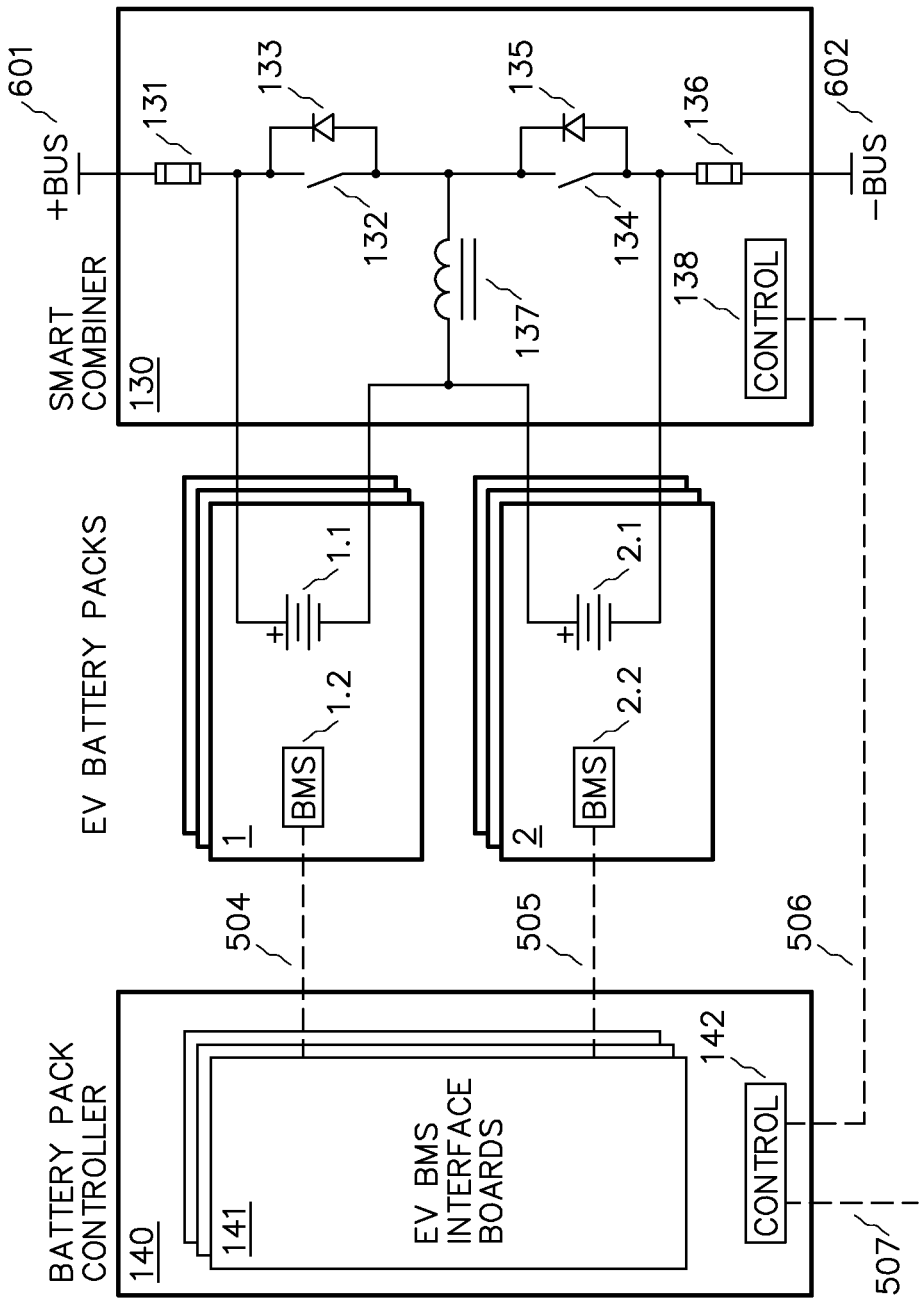
FIG. 3 illustrates a battery pack controller (BPC) and smart combiner (SC) in accordance with an exemplary embodiment.

FIG. 3 is a detailed drawing of the battery pack controller 140 and smart combiner 130 as shown in FIG. 1. Reference designator 1 indicates a plurality of EV battery packs (EVBP) with EVBP 1 on top. Reference designator 2 indicates a plurality EVBP with EVBP 2 on top. EVBP 1 and 2 are electrically connected in series as the first series pair in this EPS embodiment. Each series pair within the EPS communicates with one EV BMS interface board (EVIB) within in the BPC. In this first, top level case, BMS 1.2 and BMS 2.2 communicate with EVIB 141 over digital data buses 504 and 505, respectively. The communication protocol is a controller area network bus (CAN bus) as used in the original manufacturer's electric vehicle application. All other EVBP series pairs within the EPS communicate in a similar way. Control circuit 142 aggregates the data from all EVIB within BPC 140 and provides a Modbus digital communication link 507 to a system controller external to the EPS and Modbus link 506 to smart combiner 130. In accordance with an exemplary embodiment, the Modbus digital communication link 507 communicates with the overall energy system SCADA (element 501 in FIG. 1) to report the health, availability and state of charge of the "composite" battery configured from the series/parallel connection of all EV battery packs. Modbus data link 506 connects control circuit 142 to control circuit 138 to actively control the balancing of each EV battery pack in a series string.

In accordance with an exemplary embodiment, the balancing of each EV battery pack in a series string, for example, can be achieved by monitoring the voltage, current and temperature of each EV battery pack and then transferring energy from the higher voltage of the two packs in a series string to the lower voltage pack. For example, if EVBP 1 has a higher voltage than EVBP 2, then semiconductor switch 132 is closed, current flows from battery 1.1 through inductor 137, semiconductor switch 132 is opened and the current through inductor 137 flows through diode 135 and into battery 2.1 completing one energy transfer cycle. This energy transfer cycle is repeated at high frequencies for an amount of time proportional to the desired energy transfer. If EVBP 2 has a higher voltage than EVBP 1, then semiconductor switch 134 is closed, current flows from battery 2.1 through inductor 137, semiconductor switch 134 is opened and the current through inductor 137 flows through diode 133 and into battery 1.1 completing one energy transfer cycle.

FIG. 3 illustrates a method of balancing batteries in a series battery string but does not limit the disclosure to any one battery balancing method or number of EVBPs in a series string. In accordance with an exemplary embodiment, the energy storage system includes the interconnections and inter-functionality of the battery pack controller 140, EV battery pack battery management systems, 1.2 and 2.2 in this example, smart combiner 130 and overall system controller via data link 507. Fuses 131 and 136 can be used to provide fault isolation between EVBP 1 and 2 series string and the parallel circuits of all series strings +BUS 601 and −BUS 602. In accordance with an exemplary embodiment, all other series strings, for example, can be protected in a similar manner.

Figure 4:
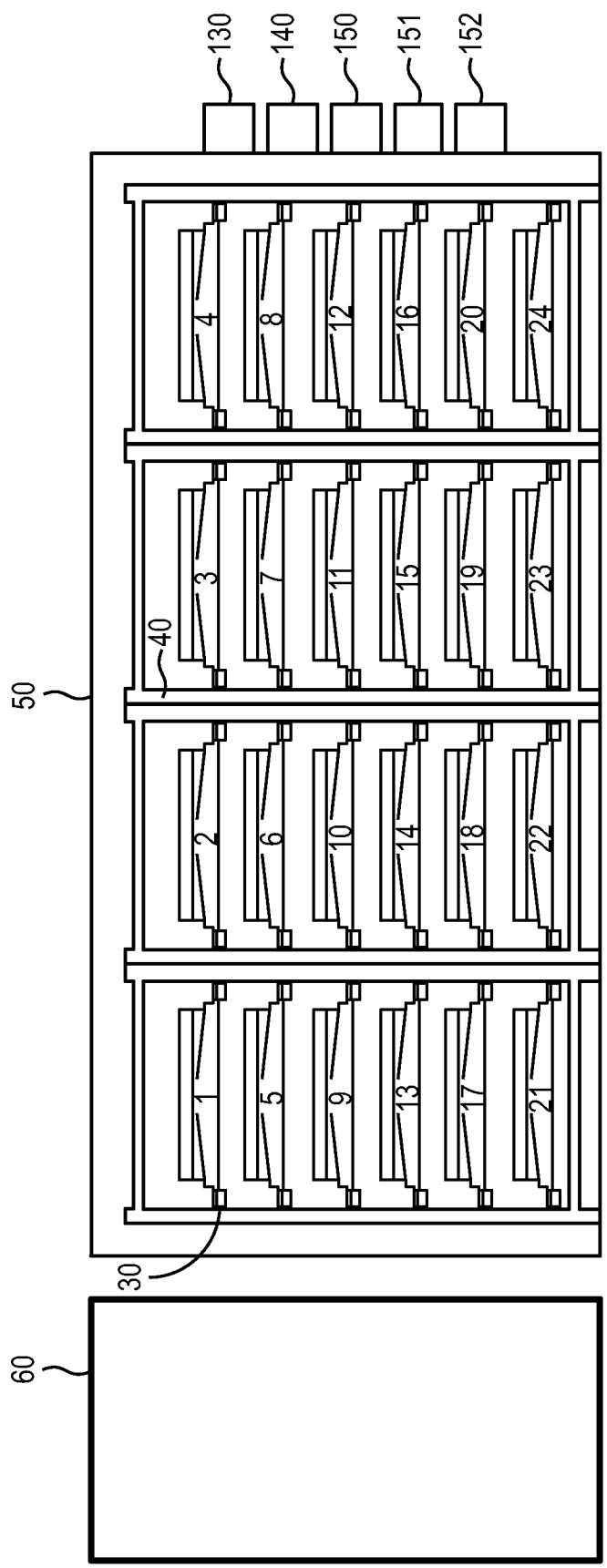
FIG. 4 illustrates the mechanical layout of an enclosure component in accordance with an exemplary embodiment.

In accordance with an exemplary embodiment, the energy storage system can include each of the elements shown in FIG. 1 within EV pack storage system (EPS) box 100 plus a weatherproof enclosure and a racking system for the EV battery packs. FIG. 4 illustrates an embodiment of the enclosure, which can include fixed and removable exterior insulated panels 60. The enclosure 50 can be designed, for example, as a cabinet where the battery system and system controls are accessible from outside the enclosure, and the enclosure or cabinet is not an occupiable space as defined in building or fire codes. In accordance with an exemplary embodiment, the enclosure 50 is an outdoor rated enclosure that enables outdoor deployment of the energy storage assembly.

In accordance with an exemplary embodiment, the racking system 40 can be fabricated from structural steel and configured to hold EV battery packs 1 through 24. Each pack in the present build of the EV pack storage system (EPS), for example, can weighs in excess of 600 pounds. The side panels 60 of the enclosure 50 can be removed, for example, to allow forklift access to rather easily install and remove EV battery packs 1 through 24. In addition, the racking system 40 is designed to allow air flow between the EV battery packs. For example, each EV battery pack can be electrically isolated from the racking system 40 by a standoff 30. The EV battery packs, for example, can be cooled and heated by a thermal management system 151 under the direction of cabinet control system 150. The thermal management system 151 may include cooling, dehumidification, and other environmental controls as a means for extending the useful lifetime of the EV battery packs. A hazard detection system 152 can provide alarms to cabinet control system 150 when smoke, gasses or temperature conditions outside of an operational range are detected.

The smart combiner 130 and battery pack controller 140 functions are described in connection with the FIG. 1 narrative. The smart combiner 130, the battery pack controller 140, the cabinet control system 150, the thermal management system 151 and the hazard detection system 152 are not shown to scale or with specific physical features. In one or more of the smart combiner 130, the battery pack controller 140, the cabinet control system 150, the thermal management system 151 and the hazard detection system 152 can be mounted to the EPS enclosure. In accordance with an exemplary embodiment, the fixed and removable exterior panels 60 of the enclosure 50 may be thermally insulated.

Techniques consistent with the present disclosure provide, among other features, an energy storage system and method employing second-life electric vehicle batteries. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. An integrated battery energy storage system, the integrated battery energy system comprising:
    a plurality of electric vehicle battery packs coupled in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series; and
    wherein the plurality of series strings of electric vehicle battery packs are connected in parallel.

2. The integrated battery energy storage system according to claim 1, wherein the plurality of electric vehicle battery packs are used without reconfiguring or modifying an original manufacturer's pack casing or enclosure.

3. The integrated battery energy storage system according to claim 1, wherein the plurality of electric vehicle battery packs are used with an original manufacturer's battery management system as originally integrated in each of the plurality of electric vehicle battery packs.

4. The integrated battery energy storage system according to claim 1, wherein each of the plurality of series strings is protected by a circuit combiner comprising an overcurrent device in series with each of the plurality series strings.

5. The integrated battery energy storage system according to claim 1, wherein each of the plurality of series strings is protected by a smart combiner comprising a plurality of DC-to-DC converters configured to balance two or more electric vehicle battery packs in a common series string by moving energy from an electric vehicle battery pack to another electrical vehicle battery pack in a common series string or by moving energy to an electric vehicle battery pack from another electrical vehicle battery pack in a common series string.

6. The integrated battery energy storage system according to claim 1, further comprising:
    a racking system for the plurality of electric vehicle battery packs; and
    an enclosure with internal environmental controls, the enclosure including removable panels configured to facilitate installation or replacement of the plurality of electric vehicle battery packs, and wherein the enclosure is not considered an occupiable space according to building or fire code definitions.

7. The integrated battery energy storage system according to claim 1, further comprising:
    a battery pack controller configured to communicate with and control a battery management system within each of the plurality of electric vehicle battery packs.

8. The integrated battery energy storage system according to claim 1, wherein the plurality of electric vehicle battery packs are second-life electric vehicle battery packs, the second-life electric vehicle battery packs being batteries repurposed from first-life applications in electric vehicles.

9. An integrated battery energy storage system, the integrated battery energy storage system comprising:
    a plurality of electric vehicle battery packs configured to store energy;
    an enclosure configured to enable outdoor deployment of the energy storage assembly;
    a plurality of removable exterior enclosure panels configured to facilitate ease of installation and removal of the plurality of electrical vehicle battery packs from the enclosure;

a plurality of DC-to-DC converters configured to balancing a voltage or energy storage capacity of series connected electric vehicle battery packs;

environmental controls within the enclosure configured to extend the usable lifetime of the plurality electric vehicle battery packs within the enclosure;

a racking system for the plurality of electric vehicle battery packs, the racking system configured to provide electrical and thermal isolation between the plurality of electric vehicle battery packs; and an electric vehicle battery pack controller configured to use an electric vehicle pack battery management system without alteration from an original manufacturer's design and intended function.

10. The integrated battery energy storage system according to claim 9, further comprising:

a bidirectional power converter configured to either convert DC electric vehicle battery pack power to AC electrical grid power or to convert AC electrical grid power to charge DC electric vehicle battery packs.

11. The integrated battery energy storage system according to claim 9, wherein the plurality of electric vehicle battery packs are used without reconfiguring or modifying an original manufacturer's pack casing or enclosure.

12. The integrated battery energy storage system according to claim 9, wherein the plurality of electric vehicle battery packs are used with an original manufacturer's battery management system as originally integrated in each of the plurality of electric vehicle battery packs.

13. The integrated battery energy storage system according to claim 9, wherein a series string of the plurality of electric vehicle batteries is protected by a circuit combiner comprising an overcurrent device.

14. The integrated battery energy storage system according to claim 9, wherein a series string of the plurality of electric vehicle batteries is protected by a smart combiner comprising a plurality of DC-to-DC converters configured to balance two or more electric vehicle battery packs in the series string by moving energy from an electric vehicle battery pack to another electrical vehicle battery pack in the series string or by moving energy to an electric vehicle battery pack from another electrical vehicle battery pack in the series string.

15. The integrated battery energy storage system according to claim 9, wherein the plurality of electric vehicle battery packs are second-life electric vehicle battery packs, and wherein the second-life electric vehicle battery packs are repurposed from first-life applications in electric vehicles.

16. A method for integrating electric vehicle battery packs into an integrated battery energy storage system, the method comprising:

coupling a plurality of electric vehicle battery packs in a series/parallel arrangement, the series/parallel arrangement including a plurality of series strings of electric vehicle battery packs, each of the plurality of series strings of electric vehicle battery packs includes at least two of the plurality of electric vehicle battery packs coupled in series; and connecting the plurality of series strings of electric vehicle battery packs in parallel.

17. The method according to claim 16, further comprising:

using the plurality of electric vehicle battery packs without reconfiguring or modifying an original manufacturer's pack casing or enclosure; and using the plurality of electric vehicle battery packs used with an original manufacturer's battery management system as originally integrated in each of the plurality of electric vehicle battery packs.

18. The method according to claim 16, further comprising:

protecting each of the plurality of series strings by a circuit combiner comprising an overcurrent device in series with each of the plurality series strings.

19. The method according to claim 16, further comprising:

protecting each of the plurality of series strings is by a smart combiner comprising a plurality of DC-to-DC converters configured to balance two or more electric vehicle battery packs in a common series string by moving energy from an electric vehicle battery pack to another electrical vehicle battery pack in a common series string or by moving energy to an electric vehicle battery pack from another electrical vehicle battery pack in a common series string.

20. The method according to claim 16, wherein the plurality of electric vehicle battery packs are second-life electric vehicle battery packs, the second-life electric vehicle battery packs being batteries repurposed from first-life applications in electric vehicles.

\* \* \* \* \*